United States Patent
Yamazaki et al.

(10) Patent No.: US 7,226,187 B2
(45) Date of Patent: Jun. 5, 2007

(54) BRIGHT DECORATIVE MOLDED ARTICLES AND MOLDED ARTICLES LOCATED IN THE BEAM PATH OF RADAR DEVICE

(75) Inventors: Hikohito Yamazaki, Toyohashi (JP); Itsuo Kamiya, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/252,742

(22) Filed: Oct. 19, 2005

(65) Prior Publication Data

US 2006/0083015 A1    Apr. 20, 2006

(30) Foreign Application Priority Data

Oct. 20, 2004   (JP) .............................. 2004-305530

(51) Int. Cl.
  *F21S 6/00*   (2006.01)
(52) U.S. Cl. ..................... 362/257; 362/605; 362/806; 425/175
(58) Field of Classification Search ................ 362/257, 362/604, 605, 806; 425/175
  See application file for complete search history.

(56) References Cited

U.S. PATENT DOCUMENTS

| | | | |
|---|---|---|---|
| 4,101,698 A * | 7/1978 | Dunning et al. ............... 428/31 |
| 4,977,695 A | 12/1990 | Armbruster | |
| 5,249,104 A * | 9/1993 | Mizobe ...................... 362/605 |
| 5,515,054 A * | 5/1996 | Radford et al. ................ 342/53 |
| 5,998,803 A * | 12/1999 | Forrest et al. ................. 257/40 |
| 6,069,674 A * | 5/2000 | Aomori et al. ................ 349/12 |
| 6,328,358 B1 * | 12/2001 | Berweiler .................... 293/115 |
| 6,750,819 B2 * | 6/2004 | Rahaim et al. ...... 343/700 MS |
| 6,817,735 B2 * | 11/2004 | Shimizu et al. ............. 362/231 |
| 2005/0031897 A1 * | 2/2005 | Kamiya et al. ............. 428/689 |
| 2005/0062412 A1 * | 3/2005 | Taniguchi et al. .......... 313/512 |

FOREIGN PATENT DOCUMENTS

DE    102 56 721 A1    11/2003

(Continued)

OTHER PUBLICATIONS

EPO Communication with Search Report for EP Appl. No. 05022379.1, dated Feb. 1, 2006 (5 pages).

*Primary Examiner*—Renee Luebke
*Assistant Examiner*—Evan Dzierzynski
(74) *Attorney, Agent, or Firm*—Finnegan, Henderson, Farabow, Garrett & Dunner LLP

(57) ABSTRACT

This invention provides a bright decorative molded article exhibiting a bright color, and particularly a gold color tone. Also, this invention provides a molded article located in the beam path of a radar device that allows only a small radio transmission loss. This bright decorative molded article comprises: an opaque resin substrate; a light-emitting device provided thereon; a transparent resin layer covering the substrate and the light-emitting device; a bright decorative layer (upper surface layer) covering the light-emitting device on the transparent resin layer; and a bright decorative layer (lower surface layer) provided on the surface of the substrate at a portion covered by the bright decorative layer (upper surface layer). Alternatively, a bright decorative molded article comprises: an opaque resin substrate; a light-emitting device provided thereon; a transparent resin layer covering the substrate and the light-emitting device; and a bright decorative layer (lower surface layer) covering part of the surface of the substrate.

15 Claims, 3 Drawing Sheets

FOREIGN PATENT DOCUMENTS

| | | |
|---|---|---|
| EP | 1 215 081 A2 | 6/2002 |
| FR | 2 730 035 A1 | 8/1996 |
| JP | 10-203261 A | 8/1998 |
| JP | 2000-118320 A | 4/2000 |
| JP | 2000-344032 | 12/2000 |

* cited by examiner

BRIGHT DECORATIVE MOLDED ARTICLES AND MOLDED ARTICLES LOCATED IN THE BEAM PATH OF RADAR DEVICE

CROSS REFERENCE TO RELATED APPLICATION

This application is based upon and claims the benefit of priority from prior Japanese Patent Application No. 2004-305530, filed Oct. 20, 2004, the entire contents of which are incorporated herein by reference.

TECHNICAL FIELD

The present invention relates to variously colored bright decorative molded articles. More particularly, the present invention relates to bright decorative molded articles that are located in the beam path of a radar device mounted behind the front grille of an automobile for the purpose of protecting such radar device.

BACKGROUND ART

A bright decorative molded article, which comprises an opaque substrate, a bright decorative layer of indium, tin, tin alloy, or the like formed on the surface thereof, and a transparent resin layer covering the bright decorative layer, has been known. Such molded article develops silver color tone from the material that constitutes a bright decorative layer. Accordingly, molded articles with other color tones have been needed, and those with gold color tone have been needed, especially for luxury automobiles. In general, a thin metal layer with a gold metallic color tone that is used for bright decorative components, such as automobile emblems, is often of yellow chrome plating. This material is characterized by a relatively low level of electric resistance. When such material is used for a front cover of the radar, accordingly, it absorbs a radar beam and does not allow it to be transmitted. This causes deterioration in the performance of the radar, and thus, such material cannot be employed for radar-mounted automobiles under current conditions.

An automatic cruise control system is a technique of measuring a distance from an automobile in front and relative velocity via a sensor mounted in the front part of an automobile, operating the throttle and the brakes based on such information, adequately accelerating or decelerating the automobile, and maintaining an appropriate distance between two automobiles. In recent years, this automatic cruise control system has drawn attention as a core technique of the intelligent transportation system (ITS) that is aimed at easing traffic congestion and reducing traffic accidents. In general, a radio transmitter/receiver unit, such as a millimeter wave radar sensor, has been used as a sensor for the automatic cruise control system.

As shown in FIG. 3, a radar device 100 mounted on an automobile is usually mounted behind a front grille 101. On the front grille 101, an emblem 102 of the manufacturer of the automobile or some other distinctive ornamentation is attached. The radar device emits millimeter waves that are transmitted forward through the front grille and the emblem. Light reflected by an object is returned to the radar device through the front grille and the emblem.

Accordingly, use of materials and coating materials that cause a small radio transmission loss and produce an esthetically pleasing exterior is preferable for parts that are used for the front grille, the emblem, and, in particular, the beam path of the radar device.

As described above, a radio transmitter/receiver unit is generally mounted behind the front grille of an automobile. The front grille, however, is often metal-plated, and it is difficult for highly conductive metal to efficiently transmit radio waves. In addition, the front grille is perforated with ventilation holes for air intake, and the thickness thereof is uneven. If radio waves are allowed to be transmitted through such front grille, accordingly, the rate of radio transmission through the thin portions of the front grille becomes different from that through the thick portions thereof. Thus, it is difficult to obtain accurate radar sensitivity.

JP Patent Publication (Kokai) No. 2000-344032 A discloses a radiator grille cover of an automobile with an improved appearance and inhibited radar wave diffusion, which comprises a transparent flat plate substrate, a black layer provided on part of the back surface thereof, and a colored grille layer, which has approximately the same color as the bars of the radiator grille, provided thereon via indium vapor deposition.

Thus, indium is employed as a metal to be vapor deposited on a radio-transmitting cover. Such metal is not limited to expensive indium, and a variety of metal materials are employed in order to form a metal coating. However, the color tone of such coating is limited to silver.

SUMMARY OF THE INVENTION

Indium, which is disclosed in JP Patent Publication (Kokai) No. 2000-344032 A as a component of a colored grille layer, is of a silver color tone. Thus, it does not satisfy needs for various color tones. Under the aforementioned circumstances, it is an object of the present invention to provide a bright decorative molded article exhibiting a bright color, and particularly a gold color tone. It is another object of the present invention to provide a molded article located in the beam path of the radar device that allows only a small radio transmission loss.

The present inventors have found that the aforementioned objects could be attained by producing a molded article having a specific structure and a bright decorative layer. This has led to the completion of the present invention.

Specifically, the first aspect of the present invention relates to:

(1) a bright decorative molded article comprising: an opaque resin substrate; a light-emitting device provided thereon; a transparent resin layer covering the substrate and the light-emitting device; a bright decorative layer (upper surface layer) covering the light-emitting device on the transparent resin layer; and a bright decorative layer (lower surface layer) provided on the surface of the substrate at a portion covered by the bright decorative layer (upper surface layer); and (2) a bright decorative molded article comprising: an opaque resin substrate; a light-emitting device provided thereon; a transparent resin layer covering the substrate and the light-emitting device; and a bright decorative layer (lower surface layer) covering part of the surface of the substrate.

In the present invention, the bright decorative layer (upper surface layer) and the bright decorative layer (lower surface layer) are preferably made of one or more members selected from the group consisting of indium, tin, indium alloy, and tin alloy. This is because these substances are capable of transmitting millimeter waves emitted from the radar device mounted on an automobile and they have a silver color tone.

A method for forming the bright decorative layer (upper surface layer) and/or the bright decorative layer (lower surface layer) is not limited. Specific examples thereof include: vacuum thin film formation, such as vacuum vapor deposition, ion plating, or sputtering; the vapor-phase growth method, such as thermal CVD, plasma CVD, optical CVD, or MOCVD; the Langmuir-Blodgett (LB) technique; electroless plating; and the sol-gel method. Formation of the aforementioned layer via vacuum vapor deposition or sputtering is particularly preferable. The thickness thereof is preferably between 0.1 nm and 1,000 nm, more preferably between 1 nm and 500 nm, and particularly preferably between 10 nm and 100 nm.

In the present invention, a light-emitting device is not particularly limited, and light emitting diodes (LEDs) are preferable from the viewpoint of their ability to emit light of a specific wavelength, their small sizes, and their low power consumption. When LEDs emit orange light, a bright decorative layer develops a gold color tone when the LEDs are turned on, and it develops a silver color tone when the LEDs are turned off. Thus, consumer needs are satisfied. If LEDs emitting light of a different color are mounted instead of orange light-emitting LEDs, a bright decorative molded article with a color tone other than gold can be obtained. Further, use of LEDs capable of emitting red-green-blue (RGB) light enables formation of bright decorative articles of several tens of thousands of colors that are controlled at different emission intensities.

Further, the second aspect of the present invention relates to a molded article located in the beam path of the radar device comprising the aforementioned bright decorative molded article. The automobile front emblem or the radar front cover decorated with the molded article according to the present invention does not only improve the design via a gold color tone. Such emblem or cover also would not impede radar function.

Preferable examples of tin, indium, tin alloy, and indium alloy include alloys with one or more elements selected from the group consisting of tin (Sn) alone, indium (In) alone, tin (Sn) and indium (In), tin (Sn) or indium and gallium (Ga), antimony (Sb), and bismuth (Bi).

In the present invention, an opaque resin layer has the effect of enhancing the color tone.

The present invention provides a bright decorative molded article exhibiting a bright color, and particularly a gold color tone, via specific structure composed of a bright decorative layer (upper surface layer), a bright decorative layer (lower surface layer), and a light-emitting device. Also, the present invention provides a molded article located in the beam path of the radar device that allows only a small radio transmission loss.

PREFERRED EMBODIMENTS OF THE INVENTION

Figure 1:
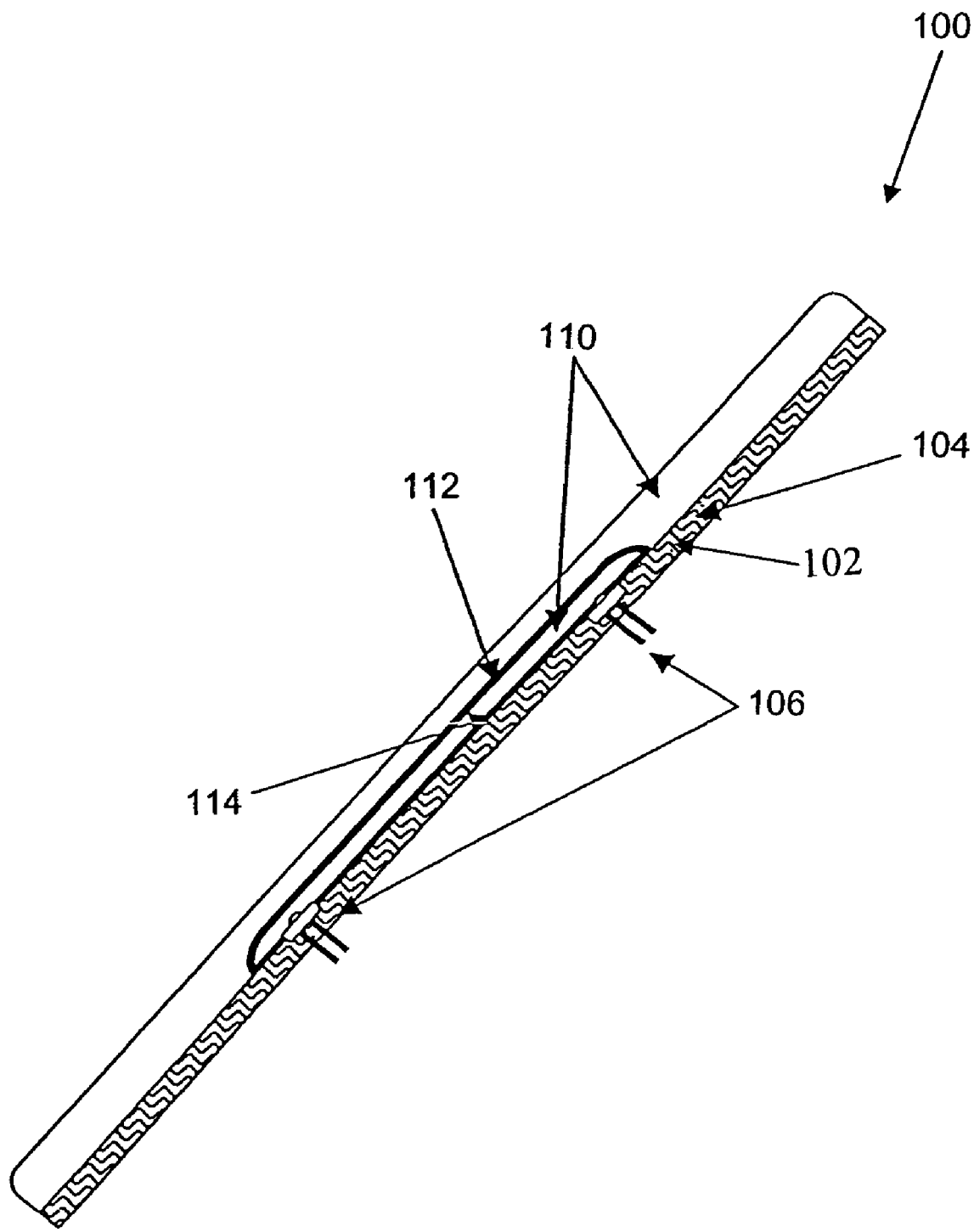
FIG. 1 shows an example of a cross section of an optimal bright decorative molded article located in the beam path of the radar device of the present invention.

FIG. 1 shows an example of a cross section of an optimal bright decorative molded article 100 located in the beam path of the radar device of the present invention. This bright decorative molded article 100 comprises a substrate 102 of an opaque resin layer 104; one or more light emitting diodes (LEDs) 106 provided thereon; a transparent resin layer 110 covering the substrate 102 and the LEDs 106; a bright decorative layer 112 (upper surface layer) covering LEDs 106 in the transparent resin layer 110; and a bright decorative layer 114 (lower surface layer) provided on the surface of the substrate 102 at a portion covered by the bright decorative layer 112 (upper surface layer). Orange light emitted from LEDs 106 is iteratively reflected between the bright decorative layer 112 (upper surface layer) and the bright decorative layer 114 (lower surface layer), and the orange light is emitted through the bright decorative layer 112 (upper surface layer) and the transparent resin layer 110 while exhibiting a gold color tone.

Figure 2:
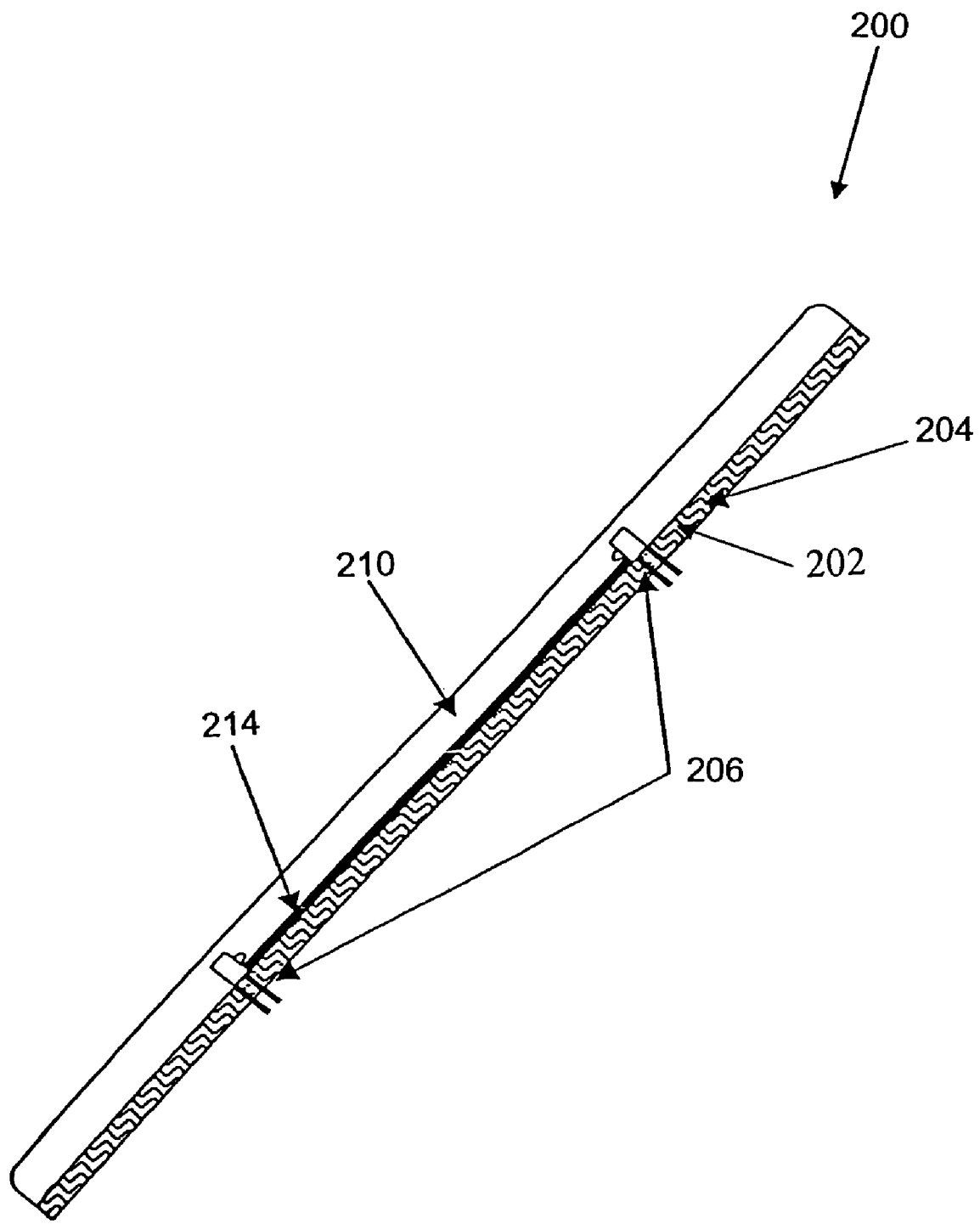
FIG. 2 shows another example of a cross-section of an optimal bright decorative molded article located in the beam path of the radar device of the present invention.
Figure 3:
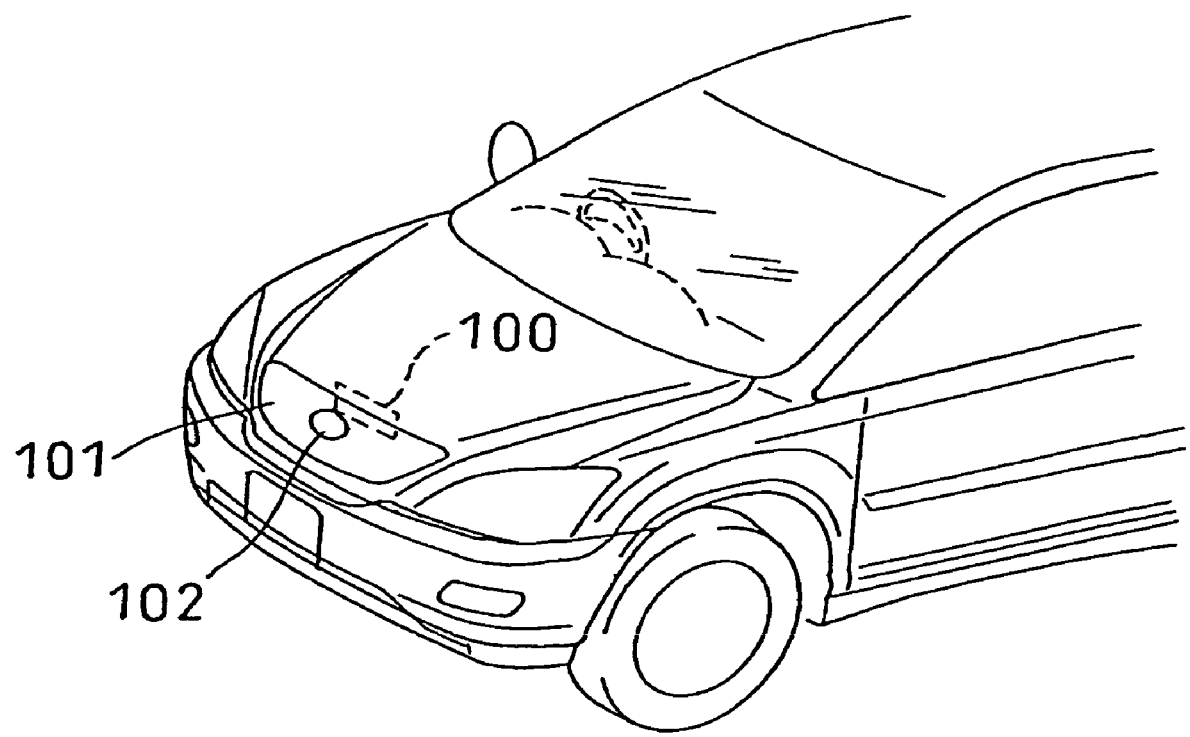
FIG. 3 is a conceptual diagram showing an automobile equipped with a radar device.

FIG. 2 shows another example of a cross section of an optimal bright decorative molded article 200 located in the beam path of the radar device of the present invention. This bright decorative molded article comprises a substrate 202 of an opaque resin layer 204; light emitting diodes (LEDs) 206 provided thereon; a transparent resin layer 210 covering the substrate and the LEDs 206; and a bright decorative layer 214 (lower surface layer) provided on the surface of the substrate at a portion covered by the bright decorative layer 212 (upper surface layer). Orange light emitted from LEDs 206 is, reflected by the bright decorative layer 214 (lower surface layer) and is then emitted through a transparent resin layer 210 while exhibiting a gold color tone.

In the present invention, a transparent resin layer is not particularly limited. Cyclic polyolefin resins such as polynorbornene or polycyclohexene resins are preferable because of their amorphous nature and excellent transparency.

The cyclic polyolefin resins that are used in the present invention are polyolefin resins having a recurring unit having a saturated alicyclic structure. Polyolefin may comprise an unsaturated bond in a part thereof; however, polyolefin preferably has a recurring unit having a saturated alicyclic structure. Specific examples of such alicyclic structure include cycloalkane and cycloalkene structures, with a cycloalkane structure being preferable. The number of carbon atoms that constitute such alicyclic structure is generally 4 to 30, preferably 5 to 20, and more preferably 5 to 15. Examples of monomers as cyclic polyolefin starting materials include norbornene, cyclohexene, vinylcyclohexane, and substitution products thereof with alkyl or alkylidene.

Specific examples of norbornene and substitution products thereof include: 5-methyl-2-norbornene, 5,6-dimethyl-2-norbornene, 5-ethyl-2-norbornene, 5-butyl-2-norbornene, 5-ethylidene-2-norbornene, dicyclopentadiene, 2,3-dihydrodicyclopentadiene, a substitution product thereof with alkyl such as methyl, ethyl, propyl, or butyl, and a substitution product thereof with a polar group such as halogen; dimethanooctahydronaphthalene, a substitution product thereof with alkyl, a substitution product thereof with alkylidene, and a substitution product thereof with a polar group such as halogen, such as 6-methyl-1,4:5,8-dimethano-1,4,4a,5,6,7,8,8a-octahydronaphthalene, 6-ethyl-1,4:5,8-dimethano-1,4,4a, 5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; and a trimer and a tetramer of cyclopentadiene, such as 4,9:5,8- dimethano-3a,4,4a,5,8,8a,9,9a-octahydro-1H-benzoindene and 4,11:5,10:6,9-trimethano-3a,4,4a,5,5a,6,9,9a,10,10a,11,11a-dodecahydro-1H-cyclopentanthracene.

Examples of cyclic polyolefin include the following:

(a) a saturated ring polymer obtained by polymerizing the aforementioned monomers via a conventional technique of ring-opening polymerization to obtain an open-ring polymer and hydrogenating the polymer via a conventional technique of hydrogenation;

(b) a copolymer of the aforementioned cyclic olefin and ethylene;

(c) a saturated ring polymer obtained by subjecting a polymer of cyclohexadiene monomers consisting of a copolymer composed of a homopolymer of monomers derived from 1,3-cyclopentadiene, 1,3-cyclohexadiene, 1,3-cycloheptadiene, 1,3-cyclooctadiene, and a substitution product thereof, a chain conjugated diene monomer unit derived from such monomers and other monomers such as 1,3-butadiene, isoprene, 1,3-pentadiene, or 1,3-hexadiene, and/or an aromatic vinyl monomer unit derived from styrene, α-methyl styrene, o-methyl styrene, p-methyl styrene, p-tert-butyl styrene, 1,3-dimethyl styrene, divinylbenzene, vinylnaphthalene, diphenylethylene, or vinylpyridine to a conventional technique of hydrogenation; and (d) a saturated ring polymer obtained by subjecting the aforementioned homopolymer of an aromatic vinyl monomer and a copolymer of an aromatic vinyl monomer and chain conjugated diene and/or a polar vinyl monomer unit derived from methyl methacrylate, methyl acrylate, acrylonitrile, methylvinylketone, or α-cyanomethyl acrylate to a conventional technique of hydrogenation. A single type or a combination of two or more types of these cyclic olefin polymers may be used.

Further, other types of polymers can be incorporated in the cyclic polyolefin resin that is used in the present invention according to need. Examples of other types of polymers include rubber and other thermoplastic resins. Examples of rubber include natural rubber, polybutadiene rubber, polyisoprene rubber, acrylonitrile-butadiene copolymer rubber, styrene-butadiene copolymer rubber, styrene-isoprene copolymer rubber, styrene-butadiene-isoprene copolymer rubber, a hydrogenation product of diene rubber, saturated polyolefin rubber such as ethylene-propylene copolymer rubber or ethylene-α-olefin copolymer rubber, ethylene-propylene-diene copolymer rubber, α-olefin-diene copolymer rubber, urethane rubber, silicone rubber, polyether rubber, acrylic rubber, thermoplastic elastomers such as styrene-butadiene-styrene block copolymer rubber and styrene-isoprene-styrene block copolymer rubber, hydrogenated thermoplastic elastomers, urethane thermoplastic elastomers, polyamide thermoplastic elastomers, and 1,2-polybutadiene thermoplastic elastomers.

Examples of other thermoplastic resins include: polyolefins such as low-density polyethylene, high-density polyethylene, LLDPE, ultra-low-density polyethylene, polypropylene, syndiotactic polypropylene, polybutene, and polypentene; polyesters such as polyethylene terephthalate and polybutylene terephthalate; polyamides such as nylon 6 and nylon 66; ethylene-ethyl acrylate copolymer; ethylene-vinyl acetate copolymer; polystyrene; syndiotactic polystyrene; polyphenylene sulfide; polyphenylene ether; aromatic polyamide; and polycarbonate. These other thermoplastic resins can be used alone or in combinations of two or more. The thermoplastic resins are incorporated in cyclic polyolefin resins in amounts such that they would not be detrimental in terms of radio transparency, durability, or abrasion resistance of cyclic polyolefin resins. The amount is 50% by mass or less, and preferably 30% by mass or less, based on the amounts of the cyclic polyolefin resins.

According to need, additives can be incorporated in the cyclic polyolefin resins. Examples of additives include antioxidants, UV absorbers, lubricants, anticlouding agents, defogging agents, plasticizers, pigments, NIR absorbers, and antistatic agents.

The bright decorative molded articles according to the present invention can be produced via conventional techniques such as melt molding or solution casting. Examples of melt molding include melt extrusion such as T-die molding or inflation-molding, calendering, hot pressing, and injection molding. In solution casting, each component is dissolved or dispersed in a solvent, the resulting liquid is cast on a substrate, and a solvent is then dehydrated. Examples of such solvent include: aromatic hydrocarbons, such as toluene, xylene, and mesitylene; alicyclic hydrocarbons, such as cyclohexane and decalin; and halogen compounds, such as methylene chloride, chloroform, chlorobenzene, and dichlorobenzene. The content of the transparent resin in the liquid is generally 0.1% to 60% by mass, and preferably 3% to 45% by mass. The liquid can be cast on a substrate via, for example, bar coating, doctor blade coating, Meyer bar coating, roll coating, die coating, spraying, air knife coating, spin coating, and dipping. The solvent may be dehydrated and removed via conventional techniques. The solvent is dehydrated to an extent such that the amount of remaining solvent is not more than 5% by mass, preferably not more than 1% by mass, and more preferably not more than 0.5% by mass.

EXAMPLES

Hereafter, the examples of the present invention and the comparative examples are explained.

The bright decorative molded article shown in FIG. 1 was produced. In this example, a radar device was mounted behind the central portion of the front grille cover of an automobile, and a bright decorative component that would not deteriorate radar transparency was used for the front grille cover.

Examples of materials for the front cover of the radar are as follows.

Opaque resin layer: AES

Transparent resin layer: polycarbonate

Bright decorative metal layer (upper surface layer): In, Sn, and Sn alloy

Bright decorative metal layer (lower surface layer): In, Sn, and Sn alloy

Light emitting diodes: orange

The orange light-emitting diodes used in the present example preferably emit light with wavelengths of approximately 600 nm to 604 nm. If the wavelength is shorter than the lower limit thereof, the emitted light becomes yellow. In contrast, the emitted light becomes red if the wavelength is longer than the upper limit thereof. The color tone of light reflected by the bright decorative metal layer changes from an optimal gold metallic tone to yellowish or reddish.

In the present example, 2 bright decorative metal layers were provided in order to block the light in the transparent resin layer between such 2 layers when the LEDs are turned on. Thus, a bright decorative molded article with a deeper gold metallic tone can be evenly obtained. When the LEDs are turned off, outside light such as sunlight is reflected by the upper layer. This renders the LEDs mounted underneath less noticeable.

The present invention provides a bright decorative molded article that can exhibit a bright color and particularly a gold color tone. Also, the present invention provides a molded article located in the beam path of a radar device having a small radio transmission loss. Thus, a bright decorative molded article such as an automobile emblem that would fit consumer needs can be provided.

What is claimed is:

1. A bright decorative molded article comprising: an opaque resin substrate layer; a light-emitting device provided thereon; a transparent resin layer covering the substrate and the light-emitting device; an upper bright decorative layer covering the light-emitting device on the transparent resin layer; and a lower bright decorative layer provided on the surface of the substrate at a portion covered by the upper bright decorative layer, all layers of said article being substantially uniformly transmissive to electromagnetic waves emitted from a radar device.

2. The bright decorative molded article according to claim 1, wherein the upper bright decorative layer is made of at least one member selected from the group consisting of indium, tin, indium alloy, and tin alloy.

3. The bright decorative molded article according to claim 1, wherein the lower bright decorative layer is made of at least one member selected from the group consisting of indium, tin, indium alloy, and tin alloy.

4. The bright decorative molded article according to claim 1, wherein the light-emitting device is a light emitting diode.

5. The bright decorative molded article according to claim 4, wherein the light emitting diode emits orange light.

6. The bright decorative molded article according to claim 1, wherein the upper bright decorative layer and/or the lower bright decorative layer are each independently formed via vacuum vapor deposition or sputtering.

7. The bright decorative molded article according to claim 1, wherein the upper bright decorative layer and/or the lower bright decorative layer each independently have a thickness of 0.1 nm to 1,000 nm.

8. A molded article located in a beam path of the radar device comprising the bright decorative molded article according to claim 1.

9. A bright decorative molded article comprising: an opaque resin substrate layer; a light-emitting device provided thereon; a transparent resin layer covering the substrate and the light-emitting device; and a lower bright decorative layer covering part of the surface of the substrate, all layers of said article being substantially uniformly transmissive to electromagnetic waves emitted from a radar device.

10. The bright decorative molded article according to claim 9, wherein the lower bright decorative layer is made of at least one member selected from the group consisting of indium, tin, indium alloy, and tin alloy.

11. The bright decorative molded article according to claim 9, wherein the light-emitting device is a light emitting diode.

12. The bright decorative molded article according to claim 11, wherein the light emitting diode emits orange light.

13. The bright decorative molded article according to claim 9, wherein the lower bright decorative layer is formed via vacuum vapor deposition or sputtering.

14. The bright decorative molded article according to claim 9, wherein the lower bright decorative layer has a thickness of 0.1 nm to 1,000 nm.

15. A molded article located in a beam path of the radar device comprising the bright decorative molded article according to claim 9.

* * * * *